United States Patent [19]

Allina et al.

[11] Patent Number: 5,390,065
[45] Date of Patent: Feb. 14, 1995

[54] TVSS METER ADAPTER STATUS INDICATOR

[76] Inventors: Edward F. Allina; Stanley F. Allina, Jr., both of 605 Capri Blvd., St. Petersburg, Fla. 33706

[21] Appl. No.: 732,922

[22] Filed: Jul. 19, 1991

[51] Int. Cl.6 .............................................. H02H 9/04
[52] U.S. Cl. ..................................... 361/56; 361/127;
340/638; 340/652; 362/26; 116/DIG. 5
[58] Field of Search ............... 361/117, 127, 366, 126,
361/104, 56; 338/21; 340/654, 635, 638, 521;
374/162, 161, 160; 324/556; 362/26; 116/202,
DIG. 5, DIG. 26; 385/147, 901

[56] References Cited
U.S. PATENT DOCUMENTS

| | | | |
|---|---|---|---|
| 3,352,277 | 11/1967 | Schmidt | 385/901 |
| 3,794,428 | 2/1974 | Giesecke | 116/DIG. 5 |
| 4,151,747 | 5/1979 | Gottlieb et al. | 374/161 |
| 4,800,466 | 1/1989 | Bauer et al. | 362/26 |
| 4,862,141 | 8/1989 | Jordahl | 340/521 |
| 4,931,885 | 6/1990 | Allina | 361/56 |

*Primary Examiner*—Todd E. DeBoer
*Attorney, Agent, or Firm*—Charles A. McClure

[57] ABSTRACT

Transient voltage surge suppression (TVSS) meter adapter status indication perceptible by a nearby observer. When TVSS over-voltage protective means is on-line, a visible and/or audible signal is generated within the meter adapter housing and is transmitted to the exterior. Light emitted by an indicating lamp connected in series with the over-voltage protective element is transmitted to the exterior by means of a translucent rod to which the lamp is juxtaposed extending through the meter adapter housing wall and terminating just outside. Sound emitted by a buzzer similarly located is transmitted through the housing wall upon demand of an an observer outside, who actuates a normally open switch in series with the buzzer by juxtaposing a small magnet against the housing wall.

1 Claim, 2 Drawing Sheets

TVSS METER ADAPTER STATUS INDICATOR

TECHNICAL FIELD

This invention relates to means and methods for indicating to an observer the status of transient voltage surge suppression (TVSS) means, such as in a watt-hour meter adapter, as active or inactive.

BACKGROUND OF THE INVENTION

On-line electrical equipment often is provided with one or more indicators, visible or audible, of its operational status as active or inactive, on-line or off-line. Recently TVSS apparatus located in a meter adapter, plugging between the conventional watt-hour meter and socket, has been provided with such a visible indicator, as taught in Allina U.S. Pat. No. 4,931,895. That patent discloses a status indicator in the form of a light-emitting diode or equivalent located substantially flush with the outside of the adapter housing.

Off-line status may result either from failure of a normally active component or by action of a protective cutoff device such as a fuse. Allina U.S. Pat. No. 4,866,560 teaches temperature-sensing in TVSS apparatus by such a "thermal" fuse that is not current-limited.

Because most watt-hour meters are located outside a dwelling or other building they are exposed to deleterious sun, rain, wind, etc. A window through which status lights inside can be viewed from outside is taught in Allina U.S. Pat. No. 4,907,119 for TVSS apparatus in a dissimilar housing. There is a continuing need to provide some such status indication without incurring deleterious external exposure.

The aforementioned patents are incorporated in their entirety by this reference for descriptive and illustrative background.

Another problem is that indicator means, however long-lived, may fail earlier if continuously actuated than if only actuated upon demand, as for a status check. The present invention meets both such needs for TVSS apparatus, whether in the form of a so-called meter adapter, which is presented as an example, or in another form.

SUMMARY OF THE INVENTION

A primary object of the present invention is to provide to a local observer an omnidirectional or otherwise readily observable indication of on-line status of TVSS apparatus.

Another object of this invention is to make such an indication continuously available whether such an observer is present or not.

A further object of the invention is to provide such a TVSS on-line status indication upon intermittent demand of such observer.

Yet another object of this invention is to provide diversely perceptible (e.g., audible and visible) indications, of such status.

A still further object is to provide such on-line status indications without electrical conductors penetrating the housing wall.

Other objects of this invention include compatibility with TVSS equipment including features of the aforesaid patents, such as fuse means of distributed-resistance type and/or temperature-responsive circuit cut-off means such as thermal fuses.

In general, the objects of the present invention are attained, in TVSS apparatus having a housing, by providing externally audible, visible, or otherwise (e.g., radio frequency) detectable indication of on-line status. Such indication is exemplified by preferably continuously available visible and/or audible embodiments originating within the housing and perceptible outside the housing. A visible indicator is continuously visible, whereas an audible indicator is actuatable upon demand at any time from outside the housing.

More particularly, the audible indication means is actuated by action of the observer in juxtaposing external actuating means to the housing in the vicinity of internal actuating means responsive thereto—to actuate the indication means temporarily. A preferred external actuating means is a magnet, and preferred internal actuating means is a magnetic switch in circuit with the indication means.

Other objects of the present invention, together with means and methods for attaining the various objects, will be apparent from the following description and accompanying diagrams of preferred embodiments, which are presented by way of example rather than limitation.

DESCRIPTION OF THE INVENTION

Figure 1A:
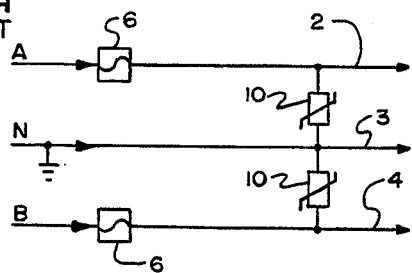
FIG. 1A is a schematic diagram of TVSS over-voltage protective means between a fused external power source and an external ground.
Figure 1B:
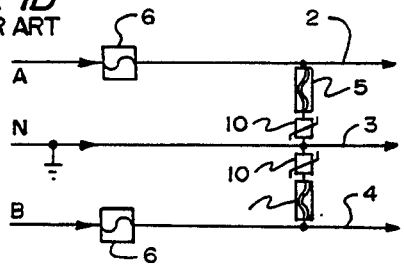
FIG. 1B is a schematic diagram similar to FIG. 1A but with fuse means added in series with the over-voltage means therebetween.

FIGS. 1A and 1B are schematically illustrative of the prior art and the setting of the TVSS apparatus of this invention.

FIG. 1A shows schematically single-phase power lines A and B (both hot) connected to respective leads 2 and 4, containing conventional localized resistance fuses 6, and also shows N (neutral) line with lead 3 connected to an external ground (usual symbol). Over-voltage protective means 10 (such as a metal oxide varistor or MOV) 10 is shown interposed between each phase line and the neutral line.

FIG. 1B differs from FIG. 1A only in addition of fuse means 5 in series circuit with the over-voltage means.

Such additional fuse means may include a distributed-resistance fuse link, and/or fusible cutoff means not current-limited, as in the second mentioned (first to issue) of the aforementioned patents, and as illustrated below.

Figure 2A:
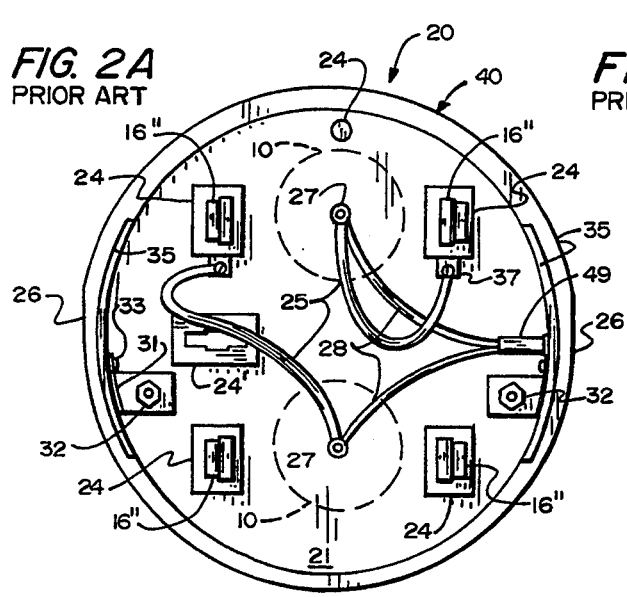
FIG. 2A is a front elevation of a meter adapter housing having a conventional visible type of TVSS status indication means.
Figure 2B:
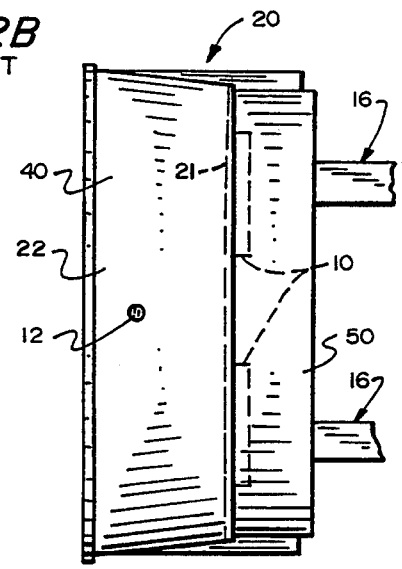
FIG. 2B is a side elevation of the meter adapter of FIG. 2A.

FIGS. 2A and 2B are further illustrative of the field of the prior art, showing (in respective front and right side elevations) cylindrical meter-adapter housing 20 of transient voltage surge suppression (TVSS) means, much as in some aforementioned patents.

Briefly, the meter adapter housing conveniently comprises major and minor generally cup-shaped portions 40 and 50, juxtaposed with major portion 40 open, as shown in FIG. 2A. It will be understood that the adapter housing contains TVSS over-voltage means (e.g., varistors 10 outlined in broken lines because out of sight here behind transverse or base wall 21 of major portion 40 of the housing) and that such varistors are connected as in FIG. 1A between power source phase leads A and B and a lead to an external ground. The power connections are made by means of blade-like terminals 16, shown fragmentarily extending from minor portion 50 of the housing, which are integral with jawlike jacks 16" inside the major portion. In use, such a meter adapter fits in plug-and-jack manner between a watt-hour meter, which plugs into the adapter, and the usual meter socket in a box or panel (into which the adapter plugs) commonly found on an outside wall of buildings with metered electrical power.

Figure 3:
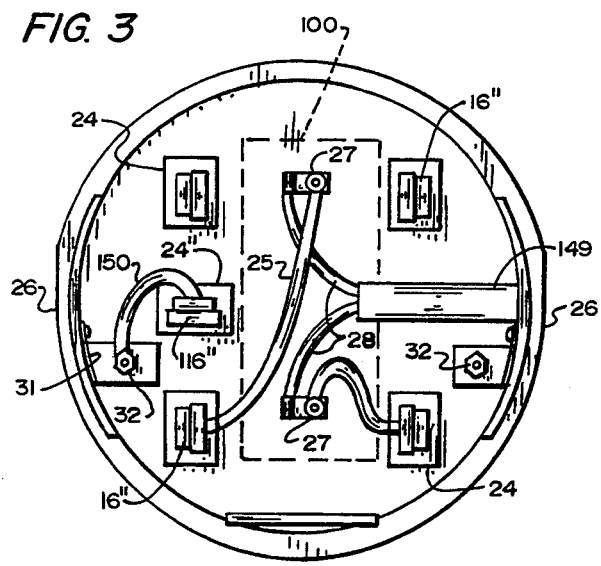
FIG. 3 is a front elevation of a first embodiment of TVSS meter adapter modified by novel visible TVSS status indication means.

FIG. 2A corresponds substantially to FIG. 3 of the first of the aforementioned patents. No attempt is made to show or to describe such a meter adapter in comparable detail here, where the prior art components often are designated by similar two-digit reference numerals, modified parts by like numbers primed, and new ones by three-digits. Four rectangular bosses 24 in a nearly square layout rise from the base of the housing, each boss accommodating in a slot (hardly distinguishable) a blade-like terminal 16 having a plug-in stab (visible in FIG. 1B) outside and having at the opposite or inside end blade-receptive jaws of jacks 16". Power leads 28 connect two of the jacks to conductive fasteners 27 located, respectively, above and below one another on the vertical midline (not marked) of the housing base. Above upper fastener 27 is fastener 29 to retain major portion 40 and minor portion 50 of the housing together.

Pair of leads from hot fasteners 27 go to insulating jacket 49 of light-emitting status indicator 12, visible from outside) in wall 22. Pair of ground straps 31 are secured to fasteners 32 (one each) in the base and to fasteners 33 (one each) in sidewall 22. The straps are attached by the last mentioned fasteners to grounding collars 35 extending along minor lengths of the housing sidewall. At opposite external sides of the sidewall are flats 26, which aid in orienting the meter adapter for plugging into the meter socket.

Figure 4:
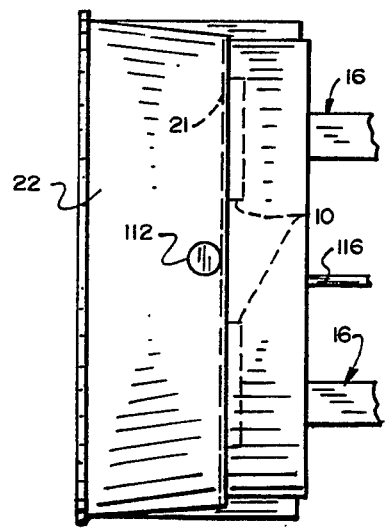
FIG. 4 is a side elevation of the meter adapter of FIG. 3.

FIGS. 3 and 4 are similar to FIGS. 2A and 2B but with features of the present invention added thereto. In FIG. 3 the former broken or dashed-line showing of varistors behind the base is omitted, replaced by similarly dashed rectangular outline of a circuit board (100) preferably superimposed in major portion 40 between the base and the viewer. Pair of leads 28' go from hot fasteners 27 into insulated jacket 149 of status light 112 (visible in FIG. 4), which is shown further, along with the circuit board, in subsequent views. A fifth terminal 116—with blade (shown in part) and jack 116"—fits in transverse boss 24' and has grounding lead 150 to fastener 32, as a supplementary ground strap useful with 208 volt network systems.

Figure 5:
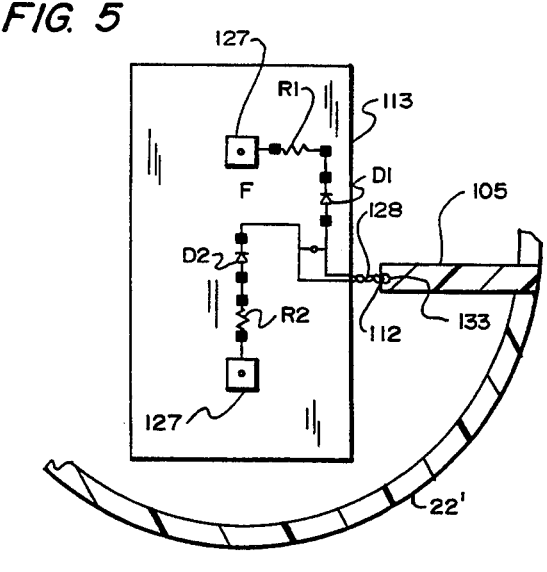
FIG. 5 is a schematic fragmentary front elevational section of the meter adapter embodiment of FIG. 3 with an embodiment of circuit board for visible status indication according to this invention.
Figure 6:
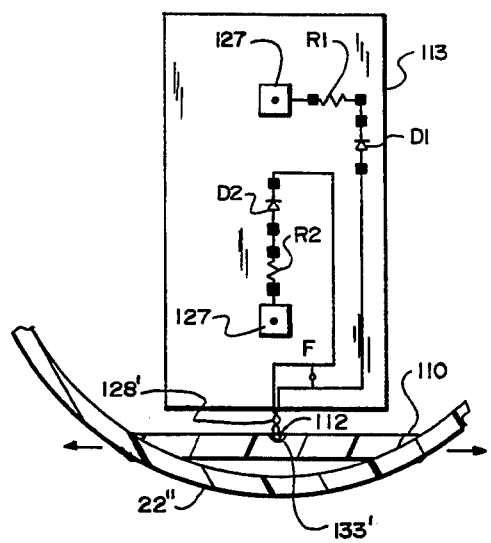
FIG. 6 is a similar view of a second embodiment of visible status indication means in a meter adapter with the first circuit board embodiment.
Figure 7:
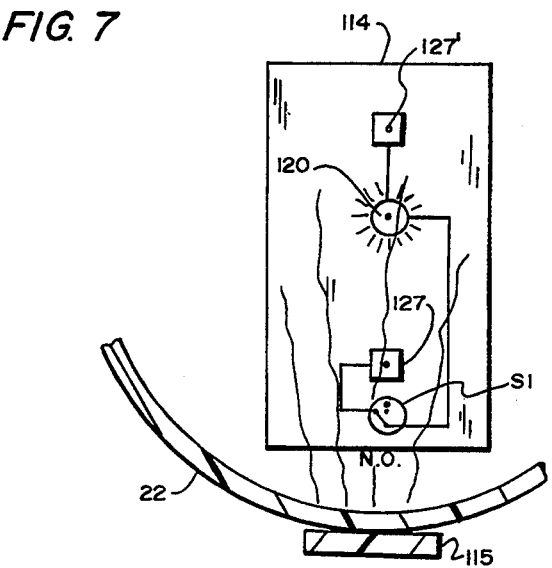
FIG. 7 is a similarly schematic and fragmentary view of an embodiment of TVSS audible status indication means for such a meter adapter.
Figure 8:
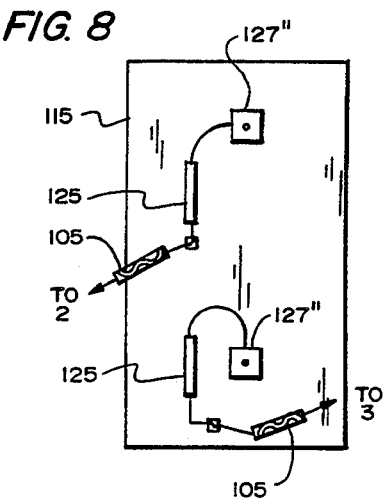
FIG. 8 is an embodiment of circuit board for additional fusing of such a TVSS meter adapter.

FIGS. 5 and 6 show alternative embodiments of visible status indicator according to this invention. FIG. 7 shows an embodiment of audible indicator, and FIG. 8 shows additional apparatus, useful according to this invention. FIGS. 5 to 8 show faces of circuit boards corresponding thereto and held in place by upper and lower fasteners 27 of FIG. 3 through openings in conductive pads 127 of FIGS. 5 and 6, 127' of FIG. 7, and/or 127" of FIG. 8.

FIG. 5 shows visible indicator circuit board face 113 with pair of conductive pads 127 (overlying and in conductive contact with hot fasteners 27 of FIG. 3). Pair of leads 128 are connected in series circuit between such energized fasteners to indicator light 112. These leads are bridged by fuse F and contain respectively diode D1 with resistor R1 and diode R2 with resistor R2. They lead to lamp 112 intruding into recess 133 in translucent rod 105, extending laterally to and through a suitable bore in wall 22' of the major portion of the cylindrical housing and thereby held in place. Light emanated from the lamp is transmitted by the translucent rod to the exterior and is visible (arrow) to any nearby observer.

FIG. 6 shows same visible indicator circuit board 113 but with double-acting translucent rod 110 instead of previous single-acting rod 105 protruding to the exterior through the wall of the housing. Left and right end portions of the translucent rod extend snugly through bores in the housing wall and are chamfered substantially flush therewith. The translucent rod has recess 133' midway of its upper surface to receive added indicator lamp 112 therein. Light is transmitted by the translucent rod to its respective ends, just outside the housing (arrows) and thereby visible to nearby observers. The further modified wall of the housing is designated 22" here.

FIG. 7 shows circuit board face 114 with audible indicator (e.g., buzzer) 120 in series circuit with magnetic reed switch S1 between upper and lower conductive pads 127' between same energized fasteners 27. The short lines radiating from the buzzer indicate that it is sounding, as the normally open (N.O.) switch arm is shown here in its closed position. The switch is closed because actuated by the field (wavy lines) emanating from magnet 109 juxtaposed (e.g., manually) to the outside of housing 23' (omitted here). Of course, the buzzer is on standby status until the switch is closed.

FIG. 8 shows circuit board face 115 with pads 127" connected to additional fuse means interposed between same energized fasteners 27. Both temperature-sensing "thermal fuses" 125 (not current-limited, and distributed-resistance fuse links 105 to lines 2 and 3, one set to each line, are illustrated here. The thermal fuses at the face of the last circuit board break the circuit to the TVSS means in the event of a thermal runaway, as may be caused by an impending failure induced by a prolonged non-transient surge or unusual series of transient surges raising the temperature—and lowering the resistance—of the varistors too much. Of course, if a thermal fuse or similar cutoff means breaks the varistor power circuit, the visible and/or audible indicators will provide off-line status indication(s). The distributive-resistance fuse links facilitate the transmittal of the extremely rapid surges to the over-voltage varistors and aid in lowering current surges. (See aforementioned Allina U.S. Pat. No. 4,866,560 for such thermal cutoff means, and Allina U.S. Pat. No. 4,907,119 for such distributive-resistance fuse links.)

It will be apparent from the foregoing description and the accompanying diagrams that the respective circuit board faces of this invention may be used separately or together. On-line status causes the lamp of the visible indicator to light. A nearby observer can ascertain such on-line (or off-line) status by merely observing whether (or not) light is visible at the outside end(s) of the translucent rod, whose protruding to the outside of the adapter housing.

In addition to, or instead of, such visible indication, audible indication of on-line status is readily checked by holding a small magnet to the outside surface of the housing wall, thereby actuating the magnetic switch to close in the indicator circuit, whereupon the resulting sound (e.g., buzzing) can be heard by such observer.

Absence of visible or audible indication will alert such nearby observer that the TVSS surge protection is not operatively on-line. In such event the meter is unplugged from the failed adapter, and the adapter itself is unplugged from the socket in the wall box or panel—for replacement or repair, as by insertion of new varistors. An operative meter adapter is plugged into the box or panel socket, and the meter is plugged thereinto to restore surge-protection.

No unusual materials or workmanship are required to provide the physical components of the present invention. The translucent rod is preferably polycarbonate (such as available from General Electric under the brand name "Lexan") but may be made of any of many other translucent polymeric materials from many sources. The lamp is a light-emitting diode with visibility from all sides, available from Siemens as the T1 super Argus. Buzzers and magnetic reed switches are widely available, as from Panasonic and Hamlin, respectively.

If desired, an external RF signal source may be provided to trigger an appropriately receptive switch inside the housing, but a small hand-held permanent magnet is simpler and usually preferable. Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

We claim:

1. TVSS apparatus with a substantially cylindrical housing about on-line status indicator light-transmitting means comprising a translucent rod whose opposite end portions extend from the interior to the exterior through close-fitting bores in the housing.

* * * * *